UNITED STATES PATENT OFFICE.

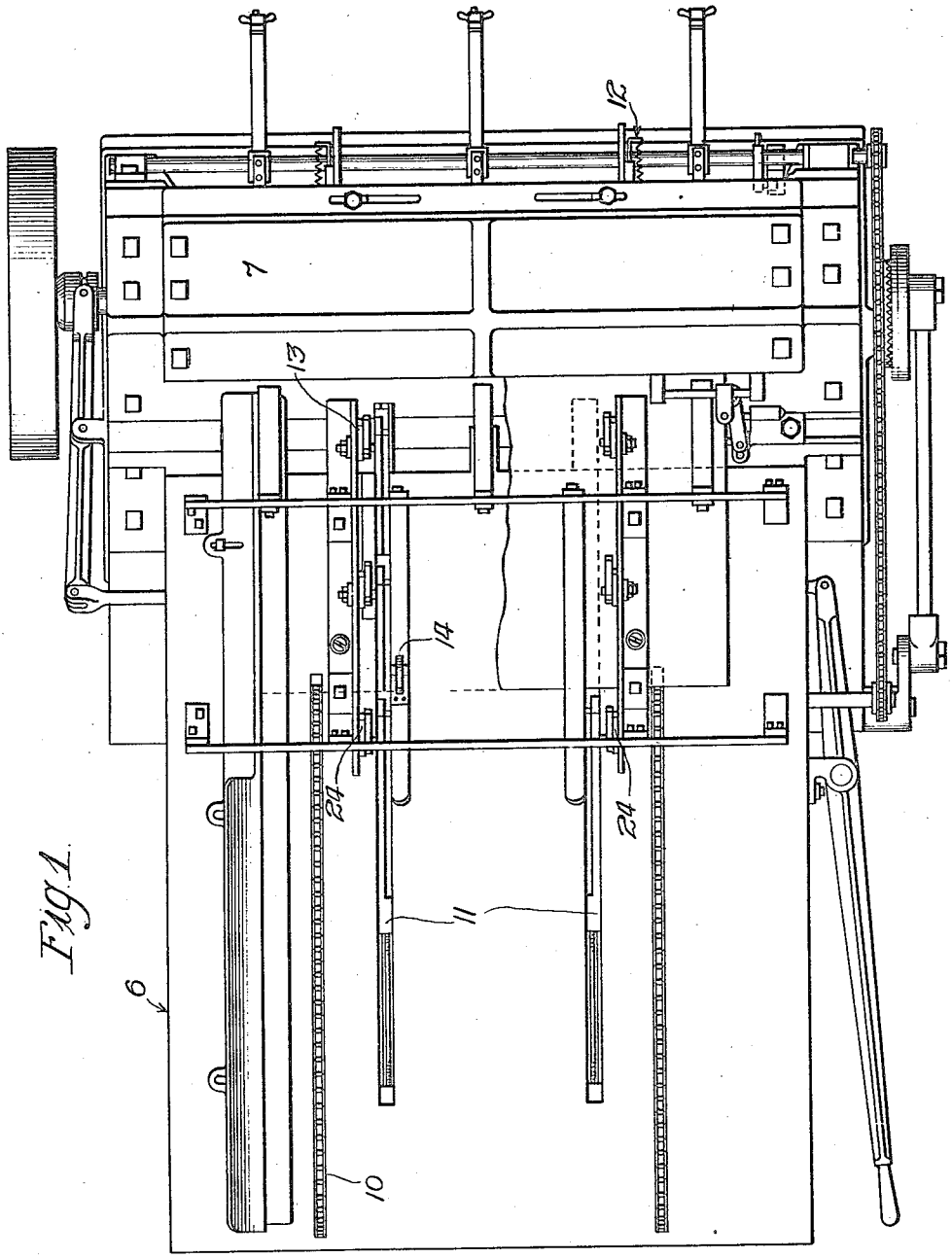

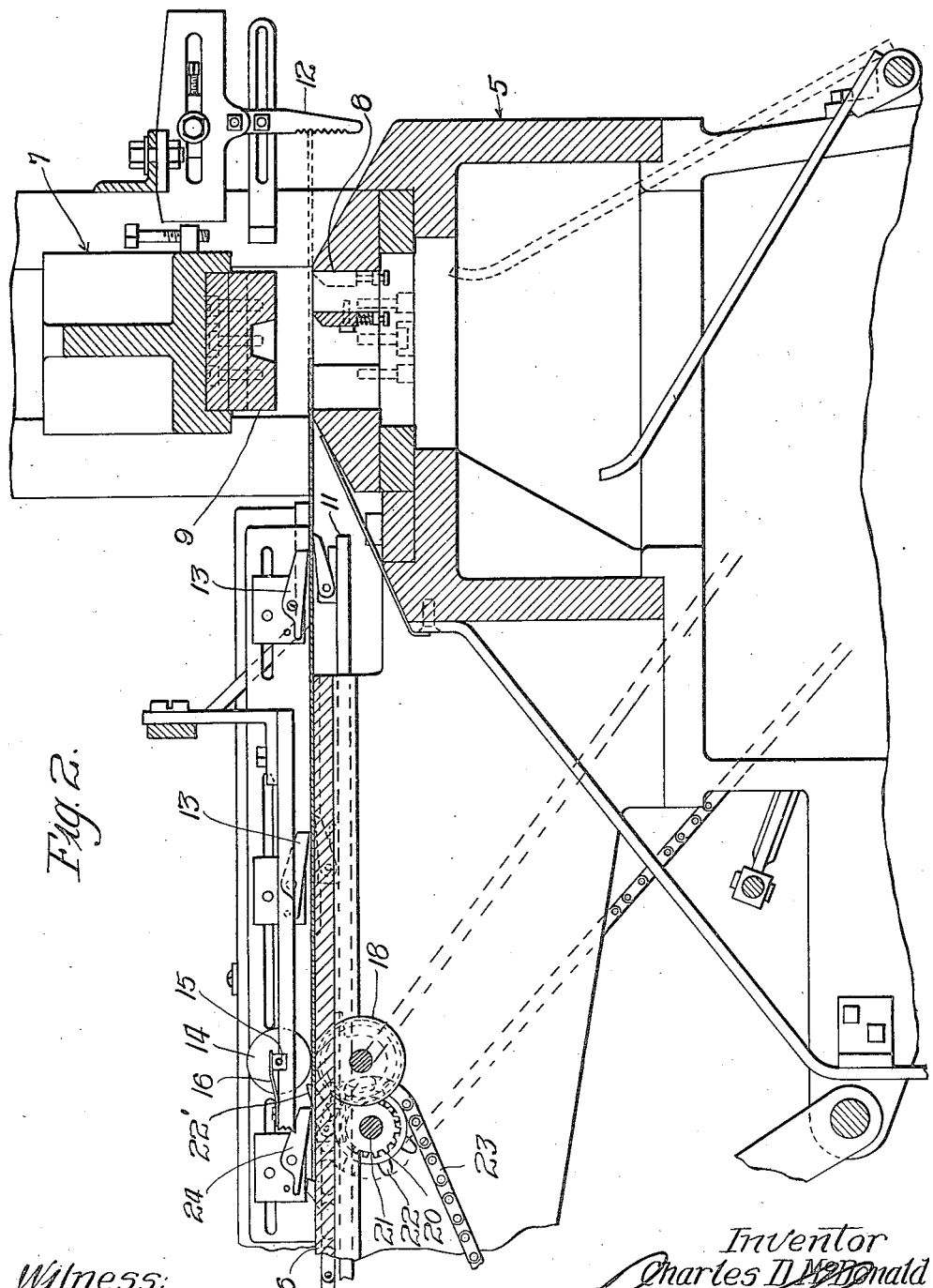

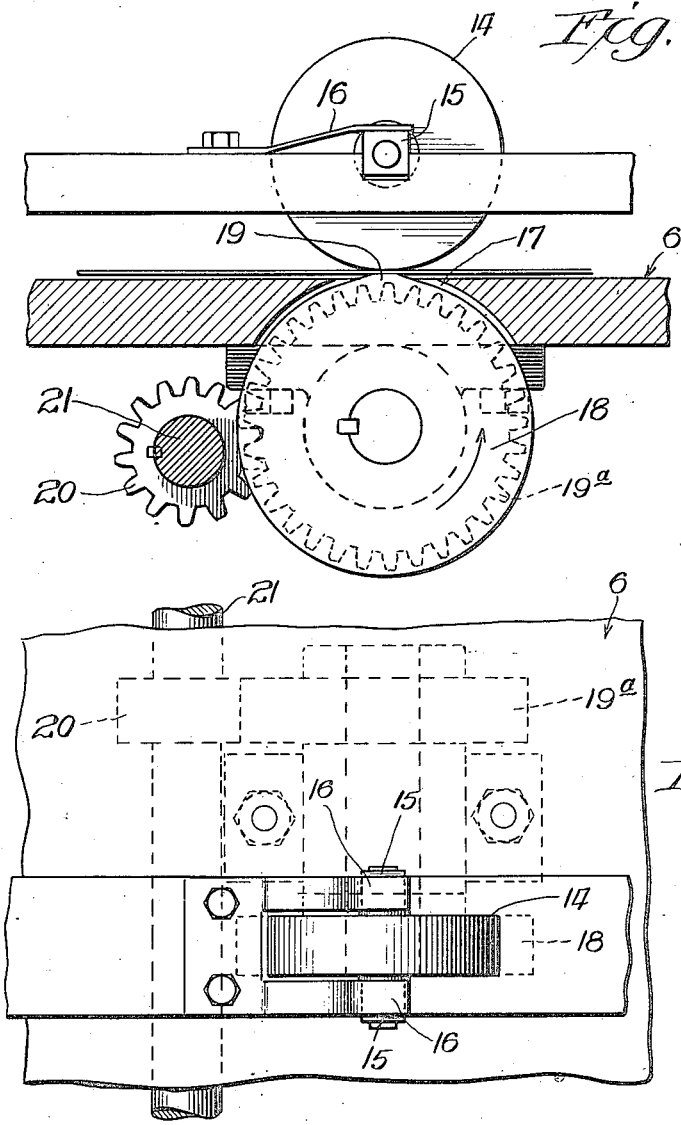

CHARLES D. McDONALD, OF CHICAGO, ILLINOIS, ASSIGNOR TO McDONALD MACHINE COMPANY, OF CHICAGO, ILLINOIS, A CORPORATION OF ILLINOIS.

METAL-SHEARING MACHINE.

1,169,333. Specification of Letters Patent. Patented Jan. 25, 1916.

Application filed May 29, 1915. Serial No. 31,246.

*To all whom it may concern:*

Be it known that I, CHARLES D. McDONALD, a citizen of the United States, residing at Chicago, in the county of Cook and State of Illinois, have invented certain new and useful Improvements in Metal-Shearing Machines, of which the following is a specification.

The present invention relates to a machine arranged and adapted for the purpose of cutting sheets of metal into blanks of a desired configuration, and is the general style of machine described and claimed in Patent No. 1,110,810, granted to me September 15, 1914, for metal working machines, application Serial No. 839,408, filed May 18, 1914 by me, for metal working machines, and application Serial No. 861,209, filed by me September 11, 1914, for metal working machines.

The main object of the invention is to provide means for engaging and shifting the work against a positive stop and center it with respect to the shearing mechanism prior to the performing of an initial or trimming cut.

A further object of the invention is to shift the work into engagement with this stop after the release of the work by the feed members and by means totally independent of the feeding means, but timed to work in synchrony therewith.

The invention further consists in the features of construction and combination of parts hereinafter described and claimed.

In the drawings: Figure 1 is a plan view showing a metal shearing machine equipped with the device of the present invention; Fig. 2, an enlarged longitudinal section of the forward or shearing portion of said machine; Fig. 3, an enlarged detail of the means for forcing the work into engagement with the fixed stop prior to the performance of the trimming cut, and, Fig. 4, a plan view of the parts shown in Fig. 3.

In the art to which the present invention relates, it is expedient to trim the edge of the sheet of work which is to be cut into blanks. This is to absolutely insure each blank being of the same width, since these blanks are afterward fed into die-presses having fixed gage rails, and any variance in the width thereof will result in either a binding of the blank as it passes through the die-press, or a wabbling of the blank, with a resultant imperfect cut of the die. A machine for performing a trimming cut prior to the shearing of the blanks proper is disclosed in application Serial No. 861,209, filed by me September 11, 1914, for metal shearing machines, and the subject-matter of this application is a refinement or modification of the machine there shown, in that it incorporates a positive means for gaging or centering the work with respect to the shearing mechanism prior to the trimming cut.

Referring now to the drawings: The machine embodies a base or foundation 5 of any suitable construction, which supports a feed table 6 and shearing mechanism 7, the latter consisting of fixed die-members 8 and a movable die-member 9. The work is carried along the feed table initially by means of endless members, as, for instance, sprocket chains 10, and is delivered into position to be engaged and further advanced in a step-by-step movement by the fingers of a reciprocating feed bar 11, and beyond the shearing mechanism is located certain shiftable means 12 which coöperate with stop or centering members 13 to center the work prior to the actual shearing cuts. All of the foregoing, however, is revealed in one form or another in the issued patent and pending applications of mine heretofore referred to, and it is not deemed necessary in this case to enter into a detailed description of the construction and arrangement thereof, since no particular construction and arrangement of the same is essential to the employment of the features of the present invention.

The present invention, as stated, deals with a means for shifting or moving the work into engagement with a positive stop or centering means whereby the centering of the work is effected prior to the initial or trimming cut, which initial or trimming cut, as the term would imply, is the severing of one edge of the work to dispense with any excess width which may be present in the sheet of metal to be later cut into blanks. The means which I have shown for carrying out this function, comprises an idle roller 14. This roller 14 is mounted to revolve in suitable bearings 15, and is held normally downward under spring tension by means of a tension member 16. This roller 14 alines with a slot or opening 17 in the table

16, and directly beneath the roller and in alinement therewith is a cam-shaped roller or disk 18, the high portion 19 of which, as will be seen from Fig. 3, constitutes a relatively small portion of the periphery. This disk or roller 18 has associated therewith a spur-gear 19' which is driven by a pinion 20 mounted on a shaft 21 and rotated by any suitable means, the rotating means shown comprising a sprocket 22 driven by chains 23; but, as stated, any suitable means of rotation may be employed.

As previously explained, the work is initially carried forward along the surface of the table 6 by means of chains 10 and is deposited in position so that its rear end is adapted to be engaged by the rear fingers 22' of the feed bar 11. Upon the forward movement of this feed bar, the work is carried forward a slightly greater distance than is necessary for properly centering it with respect to the shearing mechanism prior to the trimming operation. The movement of the disk or roller 18 is so timed as to bring the high part 19 of this roller up into engagement with the work at the time when the feed bar 11 has completed its forward stroke and is just in the course of receding; in other words, at the time when the feed finger 22' has been retracted from engagement with the end of the work. This high part 19 of the roller 18, when it comes into engagement with the work, pinches or grips the work between its surface and the surface of the roller 14, and the direction of rotation of the roller 18 being in the direction of the arrow shown in Fig. 3, it is obvious that this pinching action exerted by the high portion 19, together with the rotative movement of the roller or disk 18, will throw the work rearwardly, or in the reverse direction from which it had been moved, by the feed bar. This will bring the work up against the stop member 24 and this stop member will positively arrest the movement of the work, so that when brought into engagement therewith in the manner specified, the work will be accurately centered with respect to the shearing mechanism to produce the trimming cut.

By the foregoing means the work is always centered or placed in precisely the same relative position with respect to the shearing mechanism, prior to the trimming cut, and inaccuracies are thus eliminated which might otherwise be present if the feed bar alone were depended on to bring the work to positive position, since, as is well known, lost motion and overthrow frequently occur in these reciprocating feed bar mechanisms; and, although they are of a relatively slight degree, nevertheless, because of the accuracy with which blanks of this nature must be cut, they would ofttimes cause the production of blanks of inaccurate width, which would be undesirable.

From the foregoing, it will be seen that the mechanism of the present invention is very simple and its incorporation into the body of the machine does not affect or change in the least the principle of operation of the machine as a whole, but simply insures accurate cutting.

Where the term "fixed stop member" is used in the specification and claims, it signifies a stop member which is fixed with respect to the shearing mechanism, since all of these stop members have a pivotal movement to allow the passage of the work beneath them, as is set forth in the patent and pending applications heretofore referred to.

I claim:

1. In a machine of the class described, the combination of shearing mechanism, means for advancing the work into position to be acted upon by the shearing mechanism, and means for centering the work with respect to the shearing mechanism prior to a trimming operation, comprising a fixed stop member and means operating independently of the feeding means for placing the work against said stop member after the completion of the initial feeding movement, substantially as described.

2. In a machine of the class described, the combination of shearing mechanism, means operatively connected for feeding the work into position to be acted upon by the shearing mechanism, means for centering the work with respect to the shearing mechanism prior to a trimming operation, comprising a fixed stop member and continuously actuating means adapted to shift the work rearwardly after the completion of the initial feeding movement thereof, and against said fixed stop member, substantially as described.

3. In a machine of the class described, the combination of shearing mechanism, means for feeding the work into position to be operated upon by said shearing mechanism, means for centering the work with respect to the shearing mechanism prior to a trimming operation thereof, consisting of a fixed stop member, an upper and a lower revoluble member arranged above and below the work respectively, means for revolving said members, and one of said members being of cam-formation with the high part thereof arranged to engage the work subsequent to the end of the first feeding movement to deflect the work rearwardly and against the fixed stop member, substantially as described.

4. In a machine of the class described, the combination of shearing mechanism, means for feeding the work into position to be acted upon by the shearing mechanism, means for centering the work with respect to the shearing mechanism prior to a trimming operation, said means comprising a fixed stop member, a roller arranged above the work, a roller arranged below the work, means for positively driving one of said members, tension mechanism for holding one of said rollers in engagement with the work, and one of said rollers being of cam-formation with the high portion thereof arranged and adapted to engage with the work subsequent to the completion of the initial feeding movement to deflect the work rearwardly and against the fixed stop member, substantially as described.

CHARLES D. McDONALD.

Witnesses:
   CHAS. E. ENNES,
   FRED. J. STEVENS.